United States Patent
Rajamoni et al.

(10) Patent No.: US 11,645,582 B2
(45) Date of Patent: May 9, 2023

(54) PARAMETER SHARING IN FEDERATED LEARNING

(71) Applicant: International Business Machines Corporation, Armonk, NY (US)

(72) Inventors: Shashank Rajamoni, San Jose, CA (US); Ali Anwar, San Jose, CA (US); Yi Zhou, San Jose, CA (US); Heiko H. Ludwig, San Francisco, CA (US); Nathalie Baracaldo Angel, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 16/832,809

(22) Filed: Mar. 27, 2020

(65) Prior Publication Data

US 2021/0304062 A1  Sep. 30, 2021

(51) Int. Cl.
*G06N 20/00* (2019.01)

(52) U.S. Cl.
CPC .................................. *G06N 20/00* (2019.01)

(58) Field of Classification Search
CPC ... G06N 20/00; G06F 21/6218; G06F 16/184; G06F 16/1873
See application file for complete search history.

(56) References Cited

U.S. PATENT DOCUMENTS

2011/0238733 A1* 9/2011 Yoo ........................ G06F 11/008
                                                          709/224

2012/0246226 A1* 9/2012 Anandam ............... H04L 67/06
                                                          709/203
(Continued)

FOREIGN PATENT DOCUMENTS

| CN | 109492420 A | 3/2019 |
|----|-------------|--------|
| CN | 109635462 A | 4/2019 |

(Continued)

OTHER PUBLICATIONS

Lim, W.Y.B. et al., "Federated Learning in Mobile Edge Networks: A Comprehensive Survey", IEEE Communications Surveys & Tutorials, vol. 22, No. 3, Apr. 8, 2020, pp. 2031-2063, United States.

(Continued)

*Primary Examiner* — Eric J Yoon
(74) *Attorney, Agent, or Firm* — Sherman IP LLP; Hemavathy Perumal; Kenneth L. Sherman (57) ABSTRACT

One embodiment provides a method for federated learning across a plurality of data parties, comprising assigning each data party with a corresponding namespace in an object store, assigning a shared namespace in the object store, and triggering a round of federated learning by issuing a customized learning request to at least one data party. Each customized learning request issued to a data party triggers the data party to locally train a model based on training data owned by the data party and model parameters stored in the shared namespace, and upload a local model resulting from the local training to a corresponding namespace in the object store the data party is assigned with. The method further comprises retrieving, from the object store, local models uploaded to the object store during the round of federated learning, and aggregating the local models to obtain a shared model.

20 Claims, 8 Drawing Sheets

(56) References Cited

U.S. PATENT DOCUMENTS

| | | | | |
|---|---|---|---|---|
| 2013/0272146 | A1* | 10/2013 | Jones | H04L 43/50 370/252 |
| 2013/0282737 | A1* | 10/2013 | Chen | H04L 67/02 707/749 |
| 2015/0324690 | A1 | 11/2015 | Chilimbi et al. | |
| 2017/0109370 | A1* | 4/2017 | Newhouse | H04L 63/1491 |
| 2018/0063205 | A1* | 3/2018 | French | H04L 65/403 |
| 2018/0197089 | A1* | 7/2018 | Krasser | H04L 63/1416 |
| 2018/0373988 | A1 | 12/2018 | Dhanyamraju et al. | |
| 2020/0104523 | A1* | 4/2020 | Theimer | G06F 16/184 |

FOREIGN PATENT DOCUMENTS

| | | |
|---|---|---|
| CN | 109711529 A | 5/2019 |
| CN | 109886417 A | 6/2019 |
| CN | 110262819 A | 9/2019 |
| CN | 110288094 A | 9/2019 |
| CN | 110909865 A | 3/2020 |
| WO | 2018573021 W | 3/2018 |

OTHER PUBLICATIONS

FedAI Ecosystem Preview|Federated Learning Advancement: FATE System Practice and Federated Recommendation Algorithm, Mar. 23, 2020, https://blog.csdn.net/weixin_ 45439861/article/details/ 105053988 23, the whole webpage.

International Search Report & Written Opinion dated Jun. 18, 2021 for International Application PCT/IB2021/052262 from National Intellectual Property Administration, pp. 1-10. Beijing China.

Wang, S. et al., "Adaptive Federated Learning in Resource Constrained Edge Computing Systems," IEEE Journal on Selected Areas in Communications, 2019, pp. 1205-1221, IEEE, United States.

Nishio, T. et al., "Client Selection for Federated Learning with Heterogeneous Resources in Mobile Edge", ICC 2019—2019 IEEE International Conference on Communications (ICC), 2018, pp. 1-7, IEEE, Kyoto University, Japan.

Mcmahan, H.B., et al., "Communication-Efficient Learning of Deep Networks from Decentralized Data", Proceedings of the 20th International Conference on Artificial Intelligence and Statistics (AISTATS) 2017, pp. 1-7, vol. 54, Fort Lauderdale, United States.

Geyer, R.C. et al., "Differentially Private Federated Learning: A Client Level Perspective", 31st Conference on Neural Information Processing Systems, 2017, p. 107, ArXiv, Zurich, Switzerland.

Konecny, J et al., "Federated Learning: Strategies for Improving Communication Efficiency," arXiv preprint arXiv:1610.05492, 2016, pp. 1-10, United States.

Dai, W. et al., "High-performance distributed ML at scale through parameter server consistency models," Proceedings of the Twenty-Ninth AAAI Conference on Artificial Intelligence, 2015, pp. 79-87, United States.

Ho, Q. et al., "More Effective Distributed ML via a Stale Synchronous Parallel Parameter Server", Advances in neural information processing systems, 2013, pp. 1223-1231, United States.

Luo, L. et al. Parameter Box: High Performance Parameter Servers for Efficient Distributed Deep Neural Network Training, arXiv preprint arXiv:1801.09805, Jan. 30, 2018, pp. 1-3, United States.

Chilimbi, T. et al., "Project Adam: Building an Efficient and Scalable Deep Learning Training System," Proceedings of the 11th USENIX Symposium on Operating Systems Design and Implementation, Oct. 6-8, 2014, pp. 571-582, United States.

Harlap, A. et al., "Proteus: agile ML elasticity through tiered reliability in dynamic resource markets", EuroSys'17, Apr. 23-26, 2017, pp. 589-604, ACM, Serbia.

Bonawitz, K. et al., "Towards Federated Learning at Scale: System Design", Proceedings of the 2nd SysML Conference, Feb. 4, 2019, pp. 1-15, arXiv preprint arXiv:1902.01046., United States.

Mell et al., "The NIST Definition of Cloud Computing," National Institute of Standards and Technology Special Publication 800-145, Sep. 2011, 7 pages, United States.

Wang, S., et al., "When Edge Meets Learning: Adaptive Control for Resource-Constrained Distributed Machine Learning", IEEE INFOCOM 2018—IEEE Conference on Computer Communications, 2018, pp. 1-14, IEEE, United States.

Zhang, C. et al., "Stay Fresh: Speculative Synchronization for Fast Distributed Machine Learning," 2018 IEEE 38th International Conference on Distributed Computing Systems (ICDCS), 2018, pp. 99-109, IEEE, United States.

* cited by examiner

PARAMETER SHARING IN FEDERATED LEARNING

BACKGROUND

The field of embodiments of the invention generally relate to federated learning in distributed data environments.

Federated learning involves a collaboration between multiple parties to learn/train a predictive machine learning model based on training data comprising multiple data sources owned by the parties (i.e., data parties), without sharing/revealing the training data. The model resulting from the collaboration is more accurate than any model learned in isolation based on one data source only. Trust between the parties may vary depending on relationships between the parties. Therefore, there may be limited trust between the parties. The parties may include, but are not limited to, individuals providing personal data via mobile applications operating on their mobile devices (e.g., smartphones, Internet of things (IoT) devices, etc.), different institutions under the same umbrella company, competing companies within the same domain/field (e.g., cable companies, banks), etc.

Many issues arise with conventional federated learning systems that implement collaborative training of a machine learning model. For example, the 2019 Conference on Systems and Machine Learning (SysML '19) included a session covering a scalable aggregator for federated learning that requires custom development and maintenance to maintain scalability. As another example, Open Machine Learning (OpenML), another conventional approach that uses blockchain to store model updates, is too slow. As another example, conventional systems that implement a collaboration between multiple IoT devices by aggregating data from the IoT devices do not allow for model versioning (i.e., version control of machine learning models). Further, such conventional systems do not provide an easy way to query, and do not allow for bidirectional data flow of information. Other conventional systems that use message queue, such as Kafka® and RabbitMQ®, do not allow for model versioning. Therefore, diversity of data parties/devices participating in federated learning necessitates the need for simple, robust, and cost efficient solutions.

SUMMARY

Embodiments of the invention generally relate to federated learning in distributed data environments, and more specifically, to a method and system for parameter sharing in federated learning.

One embodiment of the invention provides a method for federated learning across a plurality of data parties. The method comprises assigning each data party with a corresponding namespace in an object store, assigning a shared namespace in the object store, and triggering a round of federated learning by issuing a customized learning request to at least one data party. Each customized learning request issued to a data party triggers the data party to locally train a model based on training data owned by the data party and one or more model parameters stored in the shared namespace in the object store, and upload a local model resulting from the local training to a corresponding namespace in the object store the data party is assigned with. The method further comprises retrieving, from the object store, at least one local model uploaded to the object store by the at least one data party during the round of federated learning, and aggregating the at least one local model retrieved from the object store to obtain a shared model. The shared model is uploaded to the shared namespace in the object store. Each data party is notified of the shared model uploaded to the shared namespace in the object store. Other embodiments include a system for federated learning across a plurality of data parties and a computer program product for federated learning across a plurality of data parties. These features contribute to the advantage of providing a scalable and fault tolerant solution to federated learning that is simple, robust, and cost efficient. These features also contribute to providing a federated learning system involving data parties and an aggregator, where the system is able to operate under any type of network connectivity, and the system provides standardized application programming interfaces (APIs) for the data parties and the aggregator.

One or more of the following features may be included. In some embodiments, for each data party, multiple versions of a local model uploaded to a corresponding namespace in the object store assigned to the data party during multiple rounds of federated learning are stored. In some embodiments, multiple versions of the shared model uploaded to the shared namespace in the object store during multiple rounds of federated learning are stored. These optional features contribute to the advantage of retaining historic data from any data party and providing model versioning to retrace old model state.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Embodiments of the invention generally relate to federated learning in distributed data environments, and more specifically, to a method and system for parameter sharing in federated learning. One embodiment of the invention provides a method for federated learning across a plurality of data parties. The method comprises assigning each data party with a corresponding namespace in an object store, assigning a shared namespace in the object store, and triggering a round of federated learning by issuing a customized learning request to at least one data party. Each customized learning request issued to a data party triggers the data party to locally train a model based on training data owned by the data party and one or more model parameters stored in the shared namespace in the object store, and upload a local model resulting from the local training to a corresponding namespace in the object store the data party is assigned with. The method further comprises retrieving, from the object store, at least one local model uploaded to the object store by the at least one data party during the round of federated learning, and aggregating the at least one local model retrieved from the object store to obtain a shared model.

Another embodiment of the invention provides a system for federated learning across a plurality of data parties. The system comprises at least one processor, and a non-transitory processor-readable memory device storing instructions that when executed by the at least one processor causes the at least one processor to perform operations. The operations include assigning each data party with a corresponding namespace in an object store, assigning a shared namespace in the object store, and triggering a round of federated learning by issuing a customized learning request to at least one data party. Each customized learning request issued to a data party triggers the data party to locally train a model based on training data owned by the data party and one or more model parameters stored in the shared namespace in the object store, and upload a local model resulting from the local training to a corresponding namespace in the object store the data party is assigned with. The operations further include retrieving, from the object store, at least one local model uploaded to the object store by the at least one data party during the round of federated learning, and aggregating the at least one local model retrieved from the object store to obtain a shared model.

One embodiment of the invention provides a computer program product for federated learning across a plurality of data parties. The computer program product comprises a computer readable storage medium having program instructions embodied therewith, the program instructions executable by a processor to cause the processor to assign each data party with a corresponding namespace in an object store, assign a shared namespace in the object store, and trigger a round of federated learning by issuing a customized learning request to at least one data party. Each customized learning request issued to a data party triggers the data party to locally train a model based on training data owned by the data party and one or more model parameters stored in the shared namespace in the object store, and upload a local model resulting from the local training to a corresponding namespace in the object store the data party is assigned with. The program instructions are further executable by the processor to cause the processor to retrieve, from the object store, at least one local model uploaded to the object store by the at least one data party during the round of federated learning, and aggregate the at least one local model retrieved from the object store to obtain a shared model.

Embodiments of the invention provide a scalable and fault tolerant solution to federated learning that is simple, robust, and cost efficient. One embodiment provides a federated learning system involving data parties and an aggregator, where the system is able to operate under any type of network connectivity, able to retain historic data from any data party, provides model versioning to retrace old model state, and provides standardized application programming interfaces (APIs) for the data parties and the aggregator.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 1:
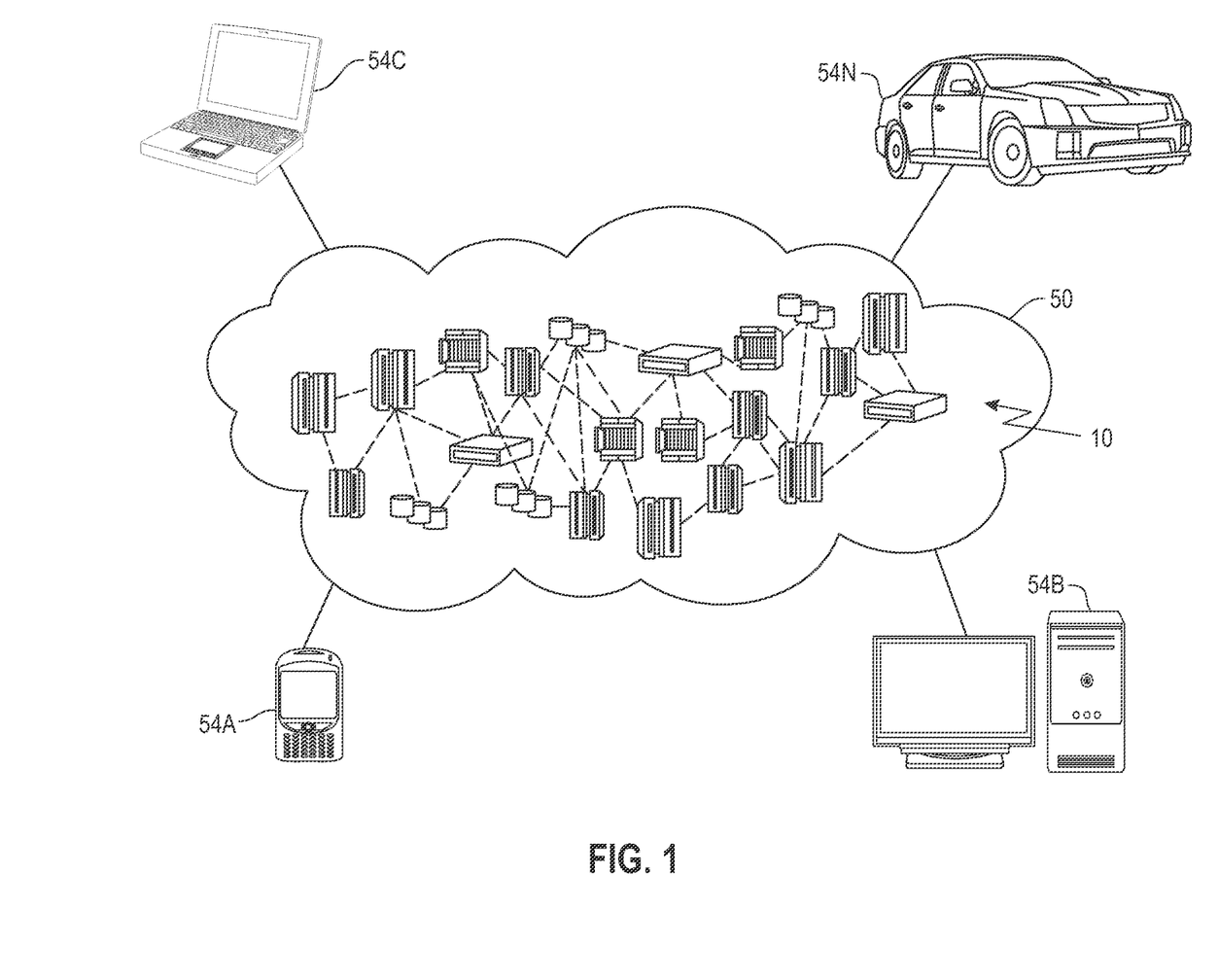
FIG. 1 depicts a cloud computing environment according to an embodiment of the present invention.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
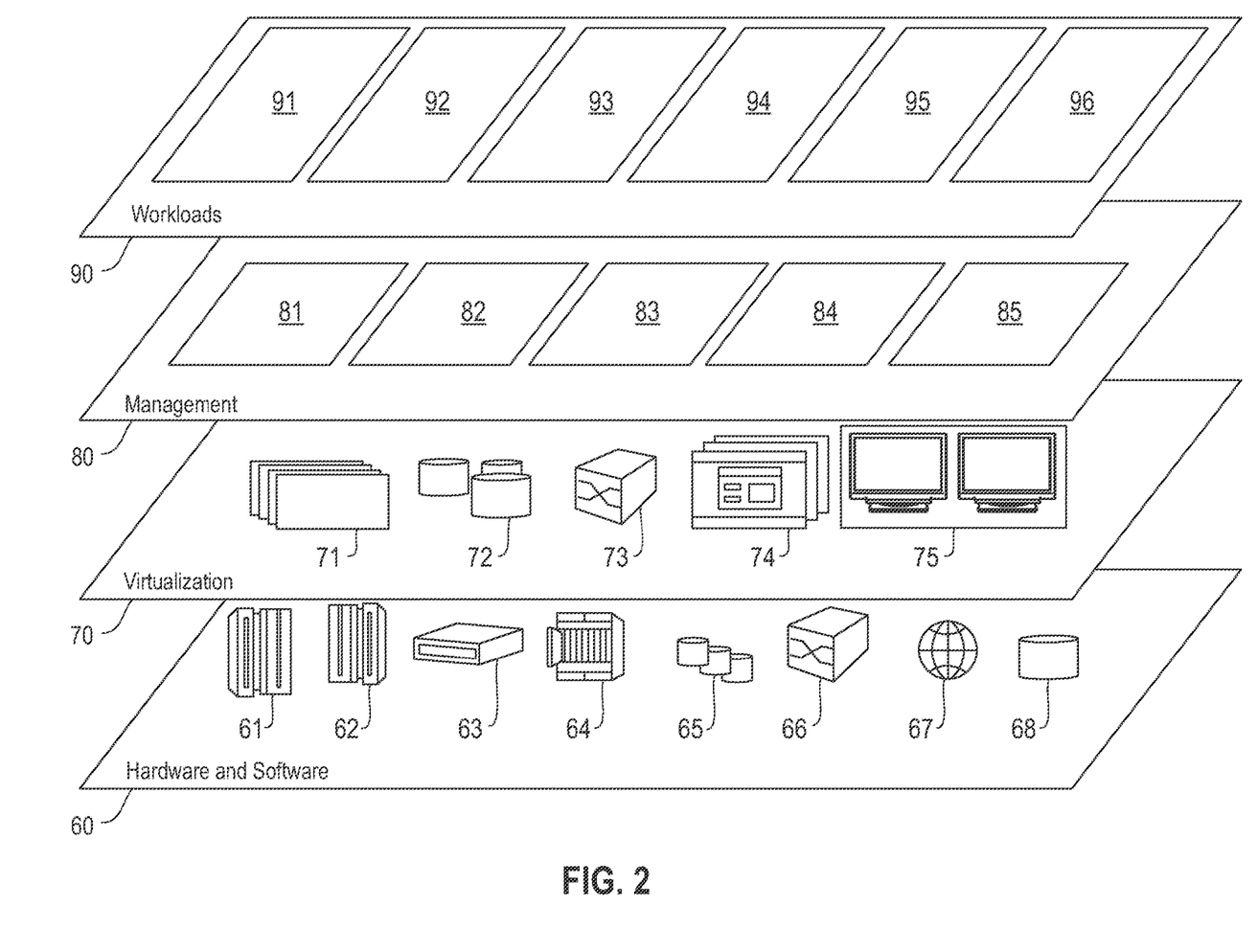
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and federated learning 96 (e.g., a federated learning system 430, as described in detail later herein).

Let $P_i$ generally denote a data party (i.e., participant) that owns one or more data sources, wherein $1 \leq i \leq N$, and i and N are integers. Let $D_i$ generally denote a data source owned by a data party $P_i$. Let $R_i$ generally denote a reply from a data source $D_i$ in response to a query received by the data source $D_i$.

Figure 3:
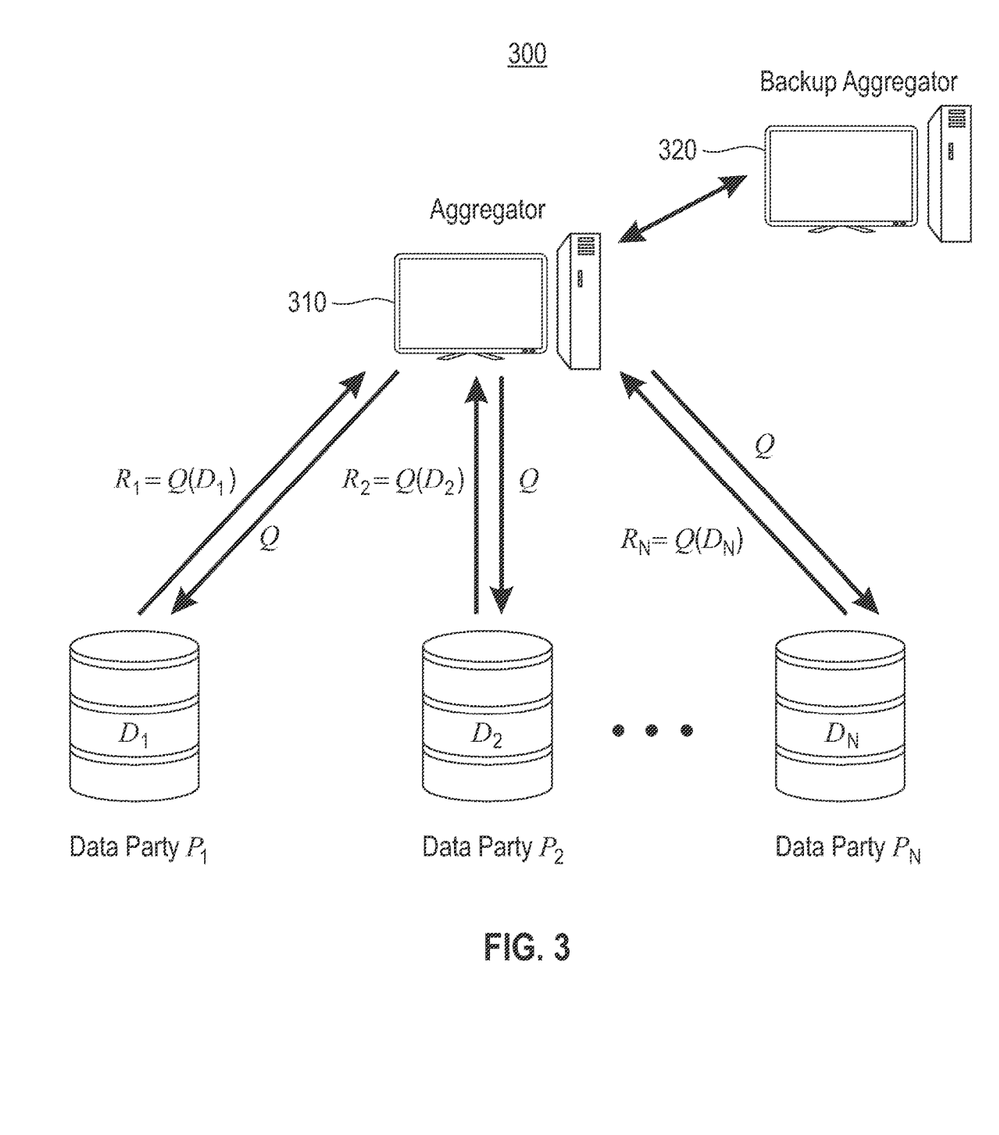
FIG. 3 illustrates an example system that implements a conventional approach to federated learning.

FIG. 3 illustrates an example system 300 that implements a conventional approach to federated learning. The system 300 is a complex computing architecture comprising an aggregator 310 configured to: (1) collect data from multiple data sources $D_1, D_2, \ldots,$ and $D_N$ owned by multiple data parties $P_1, P_2, \ldots,$ and $P_N$, respectively, and (2) aggregate the data collected. In a given epoch (i.e., round of federated learning or learning/training run), the aggregator 310 is configured to send a query Q to a data source $D_i$ owned by a data party $P_i$, and receive, from the data source $D_i$, a reply $R_i$ to the query Q. For example, as shown in FIG. 3, in response to a query Q sent to each data party $P_i$ in a given epoch, the aggregator 300 receives a reply $R_1$ from the data source $D_1$, a reply $R_2$ from the data source $D_2$, ..., and a reply $R_N$ from the data source $D_N$, wherein $R_1=Q(D_1)$, $R_2=Q(D_2)$, ..., and $R_N=Q(D_N)$. The system 300 trains a model M based on an aggregation/composition of the replies $R_1, R_2, \ldots$, and $R_N$.

The system 300 has high requirements for infrastructure at the aggregator 310 to ensure failure recovery and high availability. For example, the system 300 comprises a backup aggregator 320 for the aggregator 310.

The system 300 lacks ease of setup, requiring a complex and expensive setup. The system 300 lacks support for multiple platforms/operating systems (i.e., lacks ability to extend to other platforms/operating systems).

Other issues arising from the system 300 include loss of data (e.g., historic data) from data parties which are not selected in a given epoch, difficulties with logging, a slower development cycle, memory congestion at the data parties if the aggregator 310 fails continuously to collect data.

Figure 4:
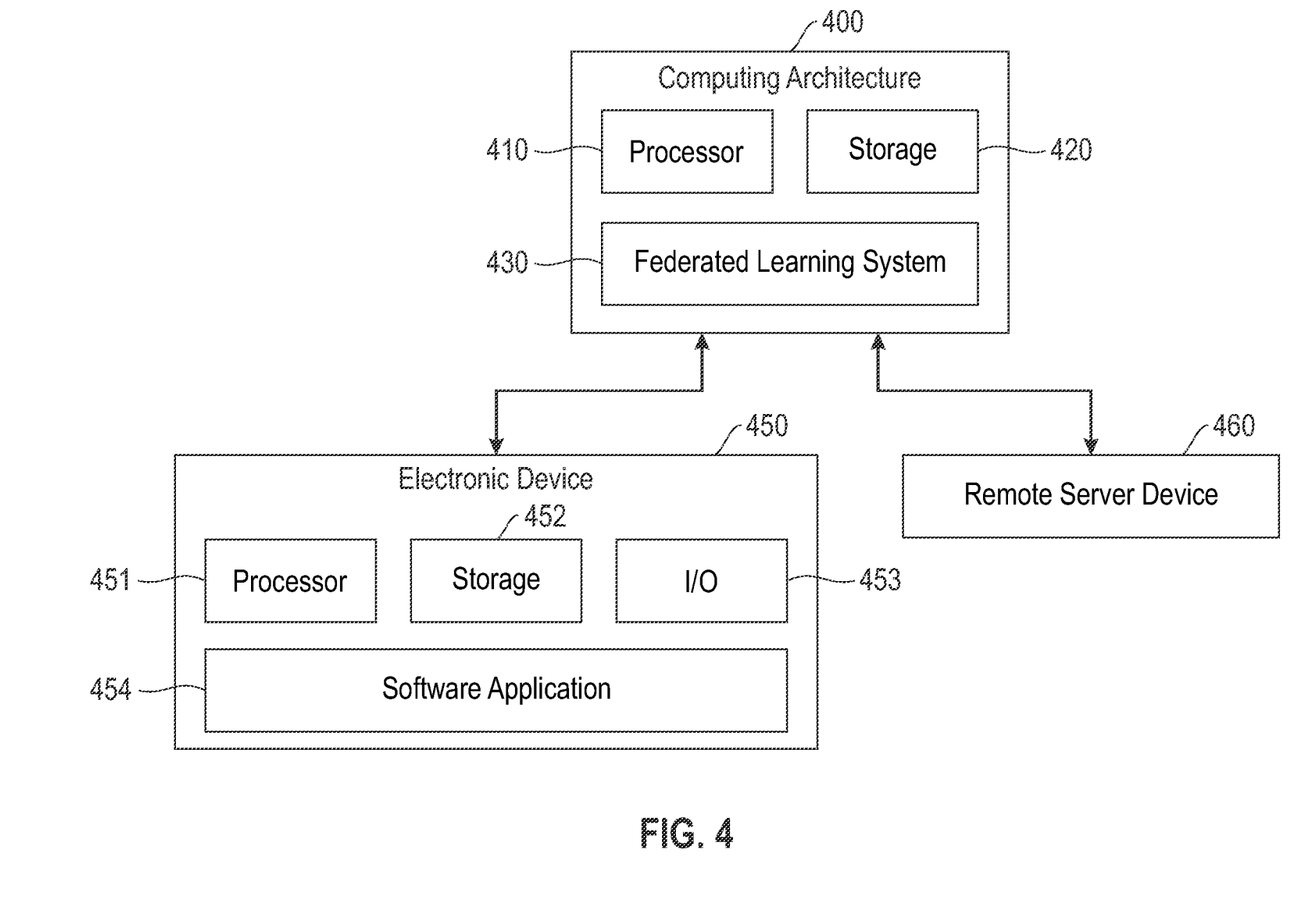
FIG. 4 illustrates an example computing architecture for implementing decentralized federated learning.

FIG. 4 illustrates an example computing architecture 400 for implementing decentralized federated learning, in accordance with an embodiment of the invention. In one embodiment, the computing architecture 400 is a centralized computing architecture. In another embodiment, the computing architecture 400 is a distributed computing architecture.

In one embodiment, the computing architecture 400 comprises computation resources such as, but not limited to, one or more processor units 410 and one or more storage units 420. One or more applications may execute/operate on the computing architecture 400 utilizing the computation resources of the computing architecture 400. In one embodiment, the applications on the computing architecture 400 include, but are not limited to, a federated learning system 430. As described in detail later herein, the federated learning system 430 provides federated learning that is decentralized, fault tolerant, and scalable.

In one embodiment, the federated learning system 430 is configured to exchange data with one or more electronic devices 450 and/or one or more remote server devices 460 over a connection (e.g., a wireless connection such as a Wi-Fi connection or a cellular data connection, a wired connection, or a combination of the two).

In one embodiment, an electronic device 450 comprises one or more computation resources such as, but not limited to, one or more processor units 451 and one or more storage units 452. One or more applications may execute/operate on an electronic device 450 utilizing the one or more computation resources of the electronic device 450 such as, but not limited to, one or more software applications 454 loaded onto or downloaded to the electronic device 450. Examples of software applications 454 include, but are not limited to, artificial intelligence (AI) applications, etc.

Examples of an electronic device 450 include, but are not limited to, a desktop computer, a mobile electronic device (e.g., a tablet, a smart phone, a laptop, etc.), a wearable device (e.g., a smart watch, etc.), an Internet of things (IoT) device, a smart appliance such as a smart television, etc.

In one embodiment, an electronic device 450 comprises one or more input/output (I/O) units 453 integrated in or coupled to the electronic device 450, such as a keyboard, a keypad, a touch interface, a display screen, etc. A user may utilize an I/O module 453 of an electronic device 450 to configure one or more user preferences, configure one or more parameters (e.g., validation properties, thresholds, etc.), provide input, etc.

In one embodiment, an electronic device 450 and/or a remote server device 460 may be a source of historical data and/or a document.

In one embodiment, the federated learning system 430 may be accessed or utilized by one or more online services (e.g., AI services) hosted on a remote server device 460 and/or one or more software applications 454 (e.g., AI applications) operating on an electronic device 450. For example, in one embodiment, a virtual assistant, a search engine, or another type of software application 454 operating on an electronic device 450 can invoke the system 430 to perform a task.

Figure 5:
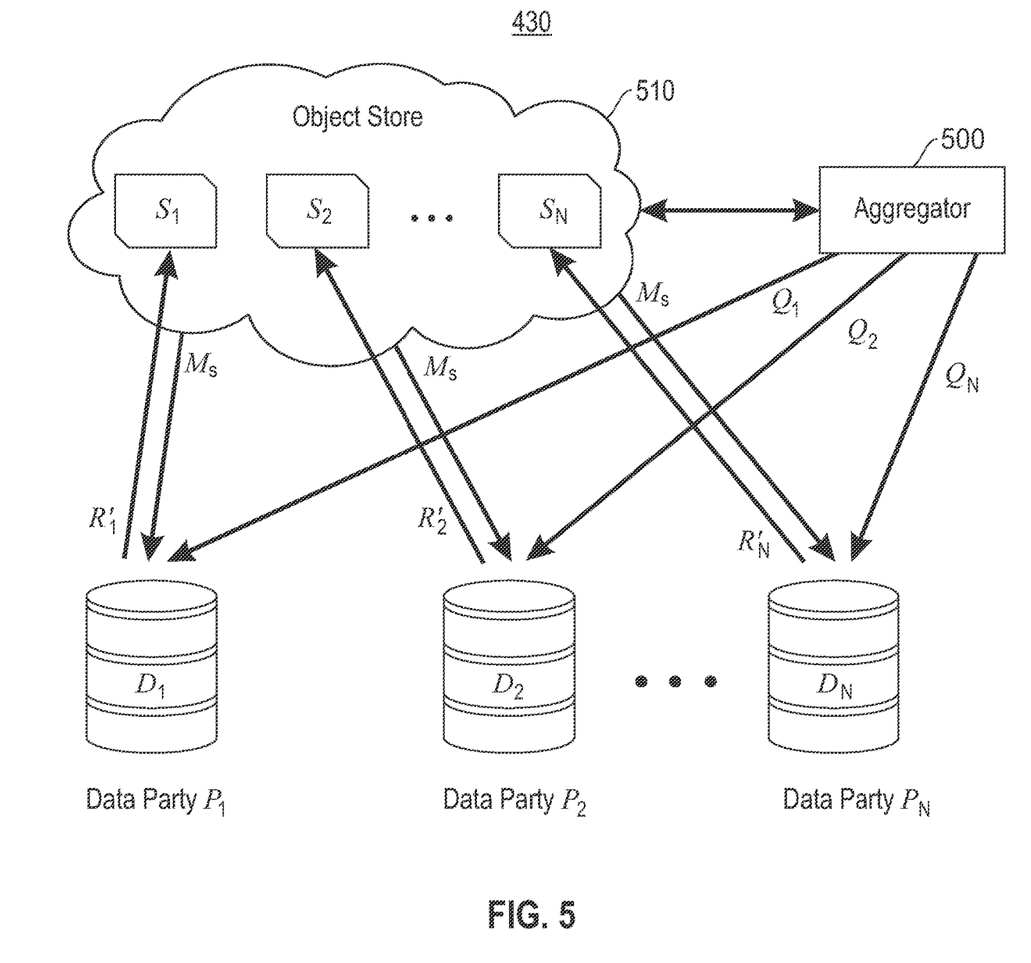
FIG. 5 illustrates an example federated learning system, in accordance with an embodiment of the invention.

FIG. 5 illustrates an example federated learning system 430, in accordance with an embodiment of the invention. In one embodiment, the system 430 comprises an aggregator 500 and an object store 510. The aggregator 500 is configured to control one or more rounds of federated learning (i.e., one or more epochs or one or more learning/training runs) across multiple data parties $P_i$ (e.g., $P_1, P_2, \ldots$, and $P_N$) in a decentralized fashion by sharing, during each round of federated learning, one or more model parameters with one or more of the multiple data parties $P_i$ via the object store 510.

In one embodiment, before one or more rounds of federated learning are initiated/triggered, the aggregator 500 is configured to, for each data party $P_i$, assign (i.e., define) a corresponding namespace in the object store 510 to the data party $P_i$. For example, as shown in FIG. 5, the aggregator 500 assigns namespaces $S_1, S_2, \ldots$, and $S_N$ in the object store 510 to data parties $P_1, P_2, \ldots$, and $P_N$, respectively.

In one embodiment, before one or more rounds of federated learning are initiated/triggered, the aggregator 500 is further configured to assign a shared namespace in the object store 510, and persist model information $M_S$ to the shared namespace in the object store 510. Initially, at the start of a first/initial epoch, the model information $M_S$ comprises either an initial (i.e., base) model or an initial model parameter set comprising one or more model parameters that define the initial model.

Let $Q_i$ generally denote a learning request customized for a data party $P_i$.

In one embodiment, the aggregator 500 communicates, to each data party $P_i$, a corresponding namespace in the object store 510 assigned/defined to the data party $P_i$ and the shared namespace in the object store 510, wherein the shared namespace is a reference to the model information $M_S$. For example, in one embodiment, in a given epoch, the aggregator 500 is configured to issue, to one or more of the multiple data parties $P_i$ in the given epoch, a learning request $Q_i$ customized for the data party $P_i$. The learning request $Q_i$ comprises, but is not limited to, a link to the object store 510, a corresponding namespace in the object store 510 assigned/defined to the data party $P_i$, a current learning/training run (i.e., current epoch or current iteration/round of federated learning), a file name to use to store a reply to the learning request $Q_i$ in the corresponding namespace, credentials to the object store 510, and the shared namespace in the object store 510.

In one embodiment, in a given epoch, the aggregator 500 is configured to issue a learning request $Q_i$ to each of the multiple data parties $P_i$ in the given epoch. In another embodiment, in a given epoch, the aggregator 500 is configured select one or more of the multiple data parties $P_i$ (e.g., in accordance with a model trained for dynamic selection), and issue a learning request $Q_i$ to the one or more data parties $P_i$ selected in the given epoch. The system 430 supports training multiple local models in parallel in a given epoch.

Let $R_i'$ generally denote a model ("local model") locally trained by a data party $P_i$.

In one embodiment, in a given epoch, in response to receiving a learning request $Q_i$ in the given epoch from the aggregator 500, a data party $P_i$ is configured to: (1) fetch model information $M_S$ from the shared namespace (included in the learning request $Q_i$) in the object store 510, (2) locally train a model based on the model information $M_S$ and training data owned by the data party $P_i$, and (3) upload a local model $R_i'$ resulting from the local training to a corresponding namespace $S_i$ (included in the learning request $Q_i$) in the object store 510.

For example, as shown in FIG. 5, in a given epoch, data party $P_1$ locally trains model $R_1'$ based on the model information $M_S$ and data source $D_1$ owned by the data party $P_1$, and uploads model $R_1'$ resulting from the local training to corresponding namespace $S_1$ in the object store 510. As another example, data party $P_2$ locally trains model $R_2'$ based on the model information $M_S$ and data source D2 owned by the data party $P_2$, and uploads model $R_2'$ resulting from the local training to corresponding namespace $S_2$ in the object store 510. As yet another example, data party $P_N$ locally trains model $R_N'$ based on the model information $M_S$ and data source $D_N$ owned by the data party $P_N$, and uploads model $R_N'$ resulting from the local training to corresponding namespace $S_N$ in the object store 510.

As stated before, if a given epoch is a first/initial epoch, the model information $M_S$ comprises either an initial (i.e., base) model or an initial model parameter set comprising one or more model parameters that define the initial model. Each data party $P_i$ issued a learning request $Q_i$ in the first/initial epoch locally trains the initial model based on training data owned by the data party $P_i$ to obtain its local model $R_i'$.

As described in detail later herein, if a given epoch is a subsequent epoch (i.e., not the first/initial epoch), the model information $M_S$ comprises either a shared model or a model parameter set comprising one or more model parameters that define the shared model. The shared model represents an aggregation of multiple local models $R_i'$ uploaded to the object store 510 in a prior epoch. Each data party $P_i$ issued a learning request $Q_i$ in the subsequent epoch locally trains the shared model based on training data owned by the data party $P_i$ to obtain a new/updated version of its model $R_i'$.

In one embodiment, in a given epoch, in response to a data party $P_i$ uploading its local model $R_i'$ to a corresponding namespace $S_i$ in the object store 510, the object store 510 is configured to notify the aggregator 500 that the local model $R_i'$ has been written to the corresponding namespace $S_i$. In another embodiment, in a given epoch, in response to a data party $P_i$ uploading its local model $R_i'$ to a corresponding namespace $S_i$ in the object store 510, the data party $P_i$ is configured to notify the aggregator 500 that its local model $R_i'$ has been written to the corresponding namespace $S_i$. For example, in a given epoch, a data party $P_i$ notifies the aggregator 500 of a new/updated version of its local model $R_i$ in a corresponding namespace $S_i$ in the object store 510 and file name used to store the new/updated version. In yet another embodiment, in a given epoch, the aggregator 500 is configured to periodically check the object store 510 for one or more new/updated versions of one or more local models $R_i$ uploaded to the object store 510 (i.e., time-based mode). For example, the aggregator 500 is configured to retrieve one or more new/updated versions of one or more local models $R_i$ from one or more namespaces $S_i$ in the object store 510 in accordance with a timed schedule.

In one embodiment, in a given epoch, after checking the object store 510 for one or more uploads or receiving one or more notification(s) of one or more uploads from the object store 510 or one or more data parties $P_i$, the aggregator 500 retrieves one or more local models $R_i$ from the object store 510, performs an aggregation of the one or more local models $R_i$, and stores a shared model resulting from the aggregation in the shared namespace of the object store 510. If a given epoch is a first/initial epoch, the aggregator 500 aggregates one or more local models $R_i'$ uploaded to the object store 510 in the first/initial epoch to obtain the shared model. If a given epoch is a subsequent epoch, the aggregator 500 aggregates one or more new/updated versions of one or more local models $R_i'$ uploaded to the object store 510 in the subsequent epoch to obtain a new/updated version of the shared model.

In one embodiment, the aggregator 500 writes the shared model and each new/updated version of the shared model to the shared namespace of the object store 510 (i.e., the aggregator persists multiple versions of the shared model to the shared namespace after a few epochs). For example, each version of the shared model is annotated/labeled with a version number indicative of a particular epoch during which the aggregator 500 obtained, via aggregation, the version of the shared model. As the system 430 keeps track of each model after each epoch, the system 430 allows for automatic logging and automatic model versioning to enable further applications. These features contribute to the advantage of retaining historic data from any data party and providing model versioning to retrace old model state.

In another embodiment, in a given epoch, the aggregator 500 replaces an old/previous version of the shared model in the shared namespace in the object store 510 with a new/updated version of the shared model $M_S$ for the given epoch.

In one embodiment, the system 430 notifies each data party $P_i$ of a new/updated version of the shared model uploaded to the shared namespace via a publish-subscribe mechanism.

In one embodiment, the aggregator 500 is configured to perform accelerated learning. For example, in one embodiment, for each data party $P_i$, the object store 510 maintains a corresponding history comprising multiple versions of its local model $R_i$ in a corresponding namespace $S_i$ in the object store 510.

In one embodiment, after a given epoch has ended, the aggregator 500 initiates/triggers another iteration/round of federated learning (i.e., another epoch or another learning/ training run) by uploading a shared model obtained during the given epoch to the shared namespace, and issuing a new learning request $Q_i$ to one or more data parties $P_i$.

In one embodiment, failure recovery in the system 430 is easy as the aggregator 500 is mostly stateless. For example, data parties $P_i$ need not depend on the aggregator 500 for the shared model as the data parties $P_i$ can fetch the shared model directly from the shared namespace. Unlike aggregators in conventional systems, the aggregator 500 is not a bottleneck or a single point of failure.

In one embodiment, the system 430 improves scalability by providing increased network connectivity (i.e., can handle more connections and can operate under any type of network connectivity) and improved storage (i.e., better storage management and avoids an extra hop). The system 430 providing a scalable and fault tolerant solution to federated learning that is simple, robust, and cost efficient.

In one embodiment, the system 430 allows for faster development cycles as APIs for object storage are well tested and known. The system 430 provides standardized APIs for the data parties and the aggregator.

Figure 6:
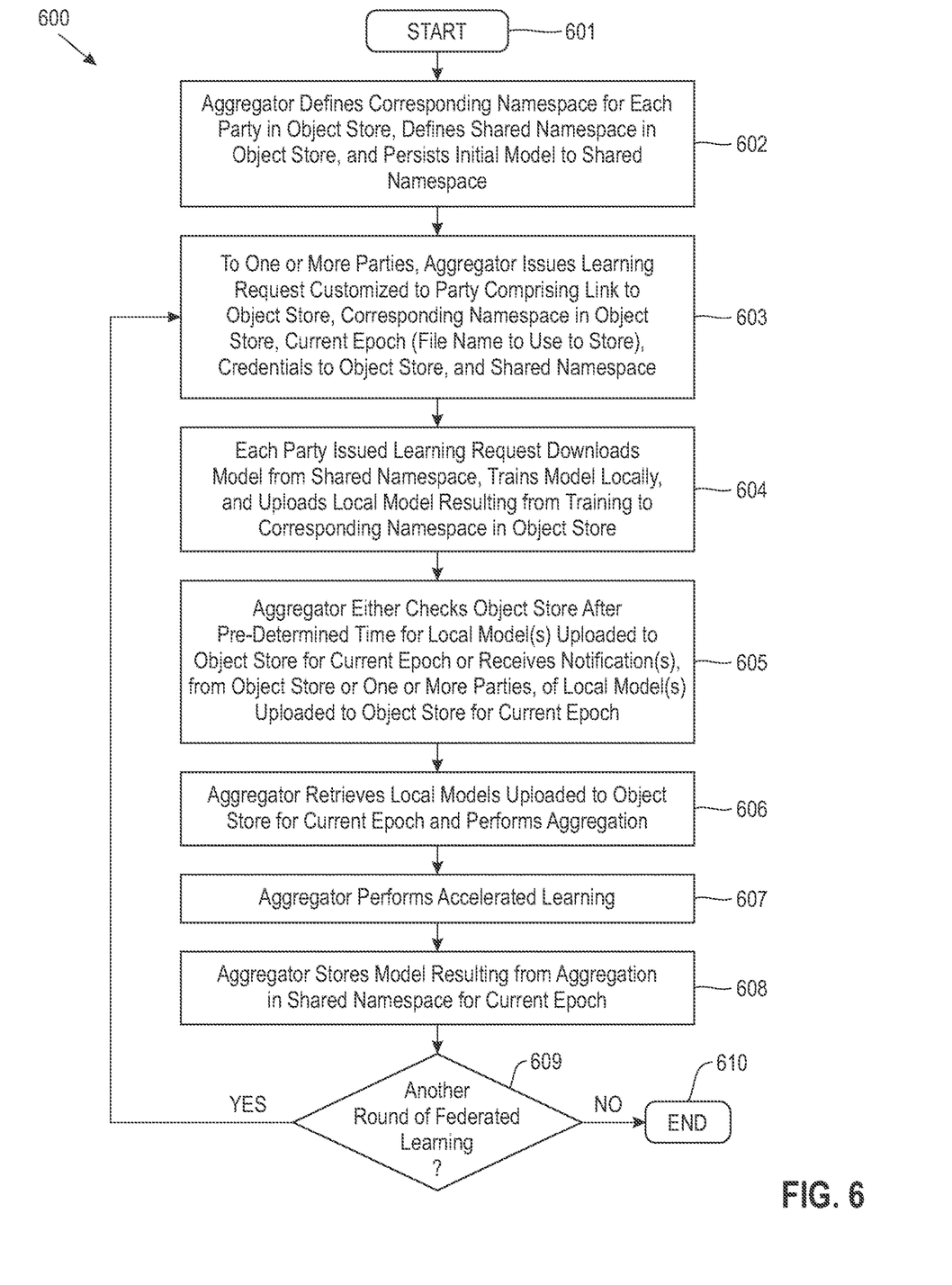
FIG. 6 is a flowchart for an example process for decentralized federated learning across multiple data parties, in accordance with an embodiment of the invention.

FIG. 6 is a flowchart for an example process 600 for decentralized federated learning across multiple data parties, in accordance with an embodiment of the invention. In process block 601, the process 600 starts. In process block 602, an aggregator (e.g., aggregator 500 in FIG. 5) defines a corresponding namespace for each data party ("party") in an object store (e.g., object store 510 in FIG. 5), defines a shared namespace in the object store, and persists an initial model to the shared mamespace. In process block 603, to one or more parties, the aggregator issues a learning request customized to the party comprising a link to the object store, a corresponding namespace in the object store, a current epoch (file name to use to store), credentials to the object store, and the shared namespace. In process block 604, each party issued a learning request downloads the model from the shared namespace, trains the model locally, and uploads a local model resulting from the training to a corresponding namespace in the object store. In process block 605, the aggregator either checks the object store after a pre-determined amount of time for local model(s) uploaded to the object store for the current epoch or receives notification(s), from the object store or one or more parties, of local model(s) uploaded to the object store for the current epoch. In process block 606, the aggregator retrieves local models uploaded to the object store for the current epoch and performs aggregation. In process block 607, the aggregator performs accelerated learning. In process block 608, the aggregator stores a model resulting from the aggregation in the shared namespace for the current epoch. In process block 609, the aggregator determines whether there is another round of federated learning. If the aggregator determines there is another round of federated learning, return to process block 603. If the aggregator determines there is not another round of federated learning, continue to process block 610 where the process 600 ends.

In one embodiment, process blocks 601-610 are performed by one or more components of the system 430, such as the aggregator 500 and the object store 510.

Figure 7:
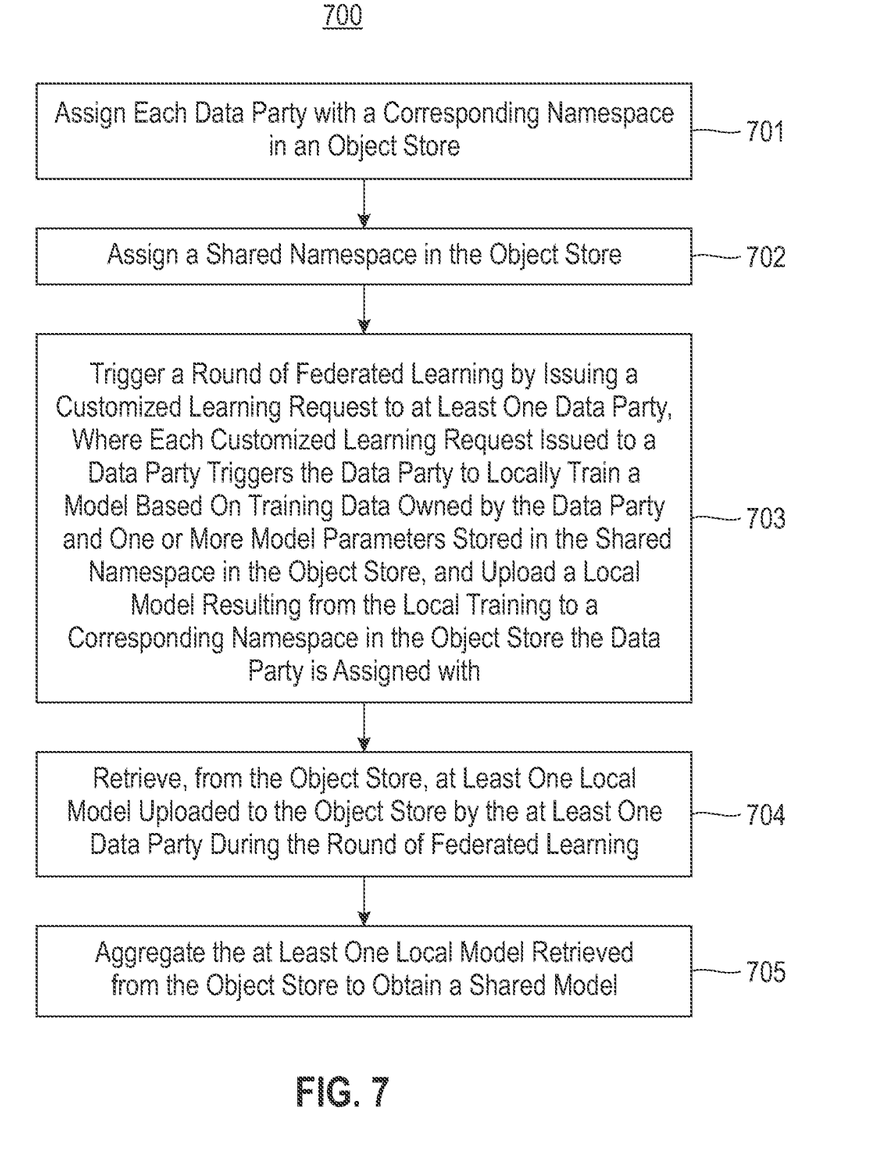
FIG. 7 is a flowchart for an example process for controlling federated learning across multiple data parties in a decentralized fashion, in accordance with an embodiment of the invention.

FIG. 7 is a flowchart for an example process 700 for controlling federated learning across multiple data parties in a decentralized fashion, in accordance with an embodiment of the invention. In process block 701, assign each data party with a corresponding namespace in an object store. In process block 702, assign a shared namespace in the object store. In process block 703, trigger a round of federated learning by issuing a customized learning request to at least one data party, where each customized learning request issued to a data party triggers the data party to locally train a model based on training data owned by the data party and one or more model parameters stored in the shared namespace in the object store, and upload a local model resulting from the local training to a corresponding namespace in the object store the data party is assigned with. In process block 704, retrieve, from the object store, at least one local model uploaded to the object store by the at least one data party during the round of federated learning. In process block 705, aggregate the at least one local model retrieved from the object store to obtain a shared model.

In one embodiment, process blocks 701-705 are performed by one or more components of the system 430, such as the aggregator 500.

Figure 8:
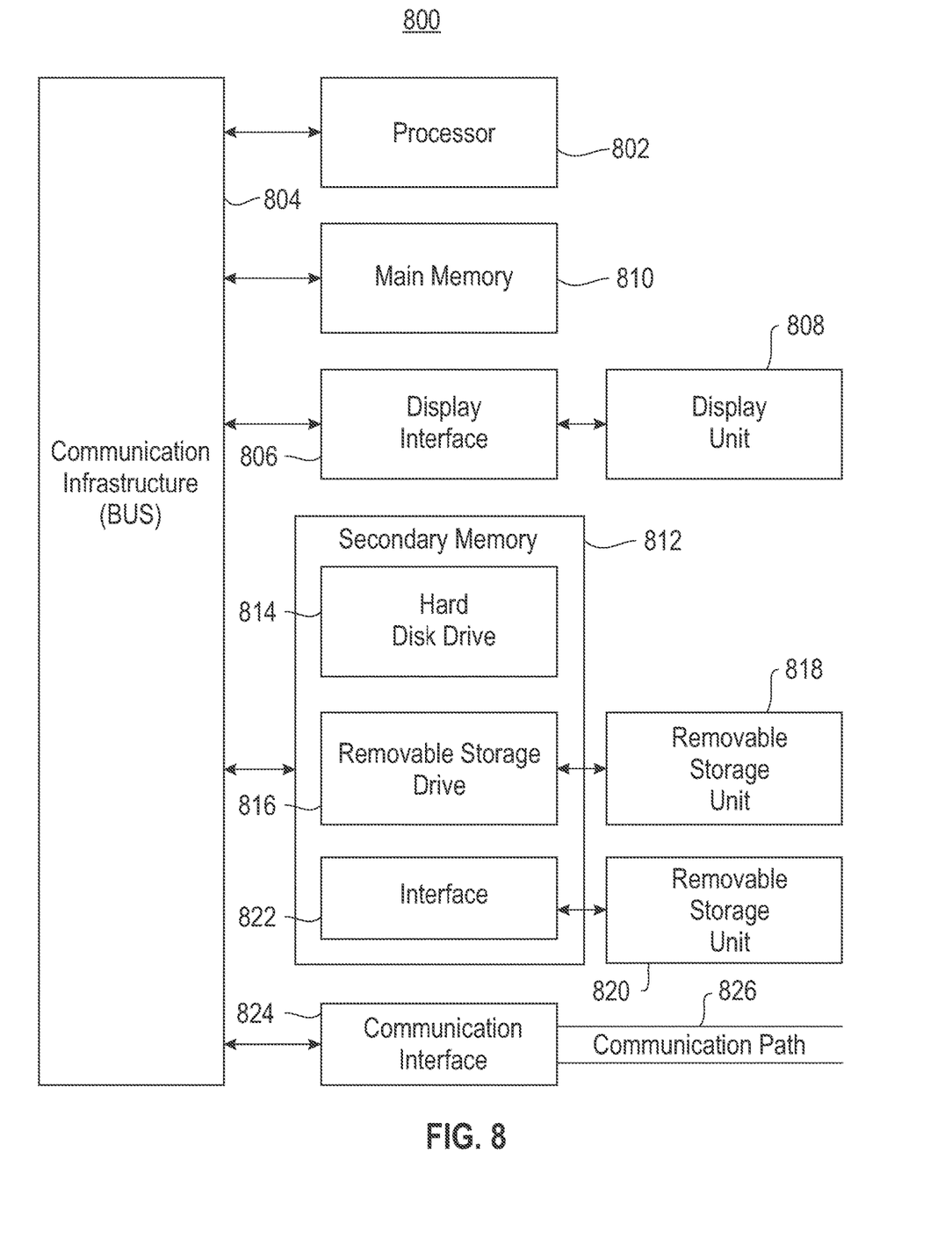
FIG. 8 is a high level block diagram showing an information processing system useful for implementing an embodiment of the invention.

FIG. 8 is a high level block diagram showing an information processing system 800 useful for implementing one embodiment of the invention. The computer system includes one or more processors, such as processor 802. The processor 802 is connected to a communication infrastructure 804 (e.g., a communications bus, cross-over bar, or network).

The computer system can include a display interface 806 that forwards graphics, text, and other data from the voice communication infrastructure 804 (or from a frame buffer not shown) for display on a display unit 808. In one embodiment, the computer system also includes a main memory 810, preferably random access memory (RAM), and also includes a secondary memory 812. In one embodiment, the secondary memory 812 includes, for example, a hard disk drive 814 and/or a removable storage drive 816, representing, for example, a floppy disk drive, a magnetic tape drive, or an optical disk drive. The removable storage drive 816 reads from and/or writes to a removable storage unit 818 in a manner well known to those having ordinary skill in the art. Removable storage unit 818 represents, for example, a floppy disk, a compact disc, a magnetic tape, or an optical disk, etc. which is read by and written to by removable storage drive 816. As will be appreciated, the removable storage unit 818 includes a computer readable medium having stored therein computer software and/or data.

In alternative embodiments, the secondary memory 812 includes other similar means for allowing computer programs or other instructions to be loaded into the computer system. Such means include, for example, a removable storage unit 820 and an interface 822. Examples of such means include a program package and package interface (such as that found in video game devices), a removable memory chip (such as an EPROM, or PROM) and associated socket, and other removable storage units 820 and interfaces 822, which allows software and data to be transferred from the removable storage unit 820 to the computer system.

In one embodiment, the computer system also includes a communication interface 824. Communication interface 824 allows software and data to be transferred between the computer system and external devices. In one embodiment, examples of communication interface 824 include a modem, a network interface (such as an Ethernet card), a communication port, or a PCMCIA slot and card, etc. In one embodiment, software and data transferred via communication interface 824 are in the form of signals which are, for example, electronic, electromagnetic, optical, or other signals capable of being received by communication interface 824. These signals are provided to communication interface 824 via a communication path (i.e., channel) 826. In one embodiment, this communication path 826 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for federated learning across a plurality of data parties, comprising:
    assigning each data party of the plurality of data parties with a corresponding namespace in an object store, wherein the corresponding namespace in the object store that the data party is assigned with is unique to the data party;
    assigning a shared namespace in the object store, wherein the shared namespace is shared by the plurality of data parties;
    storing one or more model parameters in the shared namespace in the object store;
    triggering a round of federated learning by issuing one or more customized learning requests to one or more of the plurality of data parties, wherein each customized learning request issued to each data party of the one or more data parties comprises a link to the object store, a file name to use that is indicative of the round of federated learning, and information identifying both the corresponding namespace in the object store that the data party is assigned with and the shared namespace in the object store, and the customized learning request triggers the data party to fetch the one or more model parameters from the shared namespace in the object store, locally train a model based on training data owned by the data party and the one or more model parameters, and upload using the file name a local model resulting from the local training to the corresponding namespace in the object store that the data party is assigned with;
    retrieving, from the object store, at least one local model uploaded to the object store by at least one data party of the plurality of data parties during the round of federated learning; and
    aggregating the at least one local model retrieved from the object store to obtain a shared model.

2. The method of claim 1, wherein the shared model is uploaded to the shared namespace in the object store.

3. The method of claim 2, wherein each data party of the plurality of data parties is notified of the shared model uploaded to the shared namespace in the object store.

4. The method of claim 2, further comprising:
    triggering a subsequent round of federated learning by issuing one or more subsequent customized learning requests to one or more of the plurality of data parties, wherein each subsequent customized learning request issued to each data party of the one or more data parties triggers the data party to retrieve the shared model from the shared namespace in the object store, locally train the shared model based on training data owned by the data party, and upload using a different file name that is indicative of the subsequent round of federated learning an updated version of a local model resulting from the local training to a corresponding namespace in the object store that the data party is assigned with.

5. The method of claim 1, wherein triggering a round of federated learning comprises:
    selecting a set of data parties; and
    triggering the set of data parties to locally train a set of models in parallel by issuing a customized learning request to each data party of the set of data parties.

6. The method of claim 1, wherein triggering a round of federated learning comprises:
    triggering the plurality of data parties to locally train a plurality of models in parallel by issuing a customized learning request to each data party of the plurality of data parties.

7. The method of claim 1, further comprising:
    storing, for each data party of the one or more data parties, using multiple file names that are indicative of multiple rounds of federated learning, multiple versions of a local model uploaded to a corresponding namespace in the object store assigned to the data party during the multiple rounds of federated learning.

8. The method of claim 1, further comprising:
    storing multiple versions of the shared model uploaded to the shared namespace in the object store during multiple rounds of federated learning.

9. The method of claim 1, further comprising:
    receiving, from the object store, at least one notification of the at least one local model uploaded to the object store by the at least one data party during the round of federated learning.

10. The method of claim 1, further comprising:
    receiving, from the at least one data party, at least one notification of the at least one local model uploaded to the object store by the at least one data party during the round of federated learning.

11. The method of claim 1, further comprising:
    periodically checking the object store for one or more local models uploaded to the object store by one or more data parties in accordance with a schedule.

12. A system for federated learning across a plurality of data parties, comprising:
    at least one processor; and
    a non-transitory processor-readable memory device storing instructions that when executed by the at least one processor causes the at least one processor to perform operations including:
        assigning each data party of the plurality of data parties with a corresponding namespace in an object store, wherein the corresponding namespace in the object store that the data party is assigned with is unique to the data party;

assigning a shared namespace in the object store, wherein the shared namespace is shared by the plurality of data parties;

storing one or more model parameters in the shared namespace in the object store;

triggering a round of federated learning by issuing one or more customized learning requests to one or more of the plurality of data parties, wherein each customized learning request issued to each data party of the one or more data parties comprises a link to the object store, a file name to use that is indicative of the round of federated learning, and information identifying both the corresponding namespace in the object store that the data party is assigned with and the shared namespace in the object store, and the customized learning request triggers the data party to fetch the one or more model parameters from the shared namespace in the object store, locally train a model based on training data owned by the data party and the one or more model parameters, and upload using the file name a local model resulting from the local training to the corresponding namespace in the object store that the data party is assigned with;

retrieving, from the object store, at least one local model uploaded to the object store by at least one data party of the plurality of data parties during the round of federated learning; and aggregating the at least one local model retrieved from the object store to obtain a shared model.

13. The system of claim 12, wherein the shared model is uploaded to the shared namespace in the object store.

14. The system of claim 13, wherein the operations further comprise:

triggering a subsequent round of federated learning by issuing one or more subsequent customized learning requests to one or more of the plurality of data parties, wherein each subsequent customized learning request issued to each data party of the one or more data parties triggers the data party to retrieve the shared model from the shared namespace in the object store, locally train the shared model based on training data owned by the data party, and upload using a different file name that is indicative of the subsequent round of federated learning an updated version of a local model resulting from the local training to a corresponding namespace in the object store that the data party is assigned with.

15. The system of claim 12, wherein triggering a round of federated learning comprises:

selecting a set of data parties; and triggering the set of data parties to locally train a set of models in parallel by issuing a customized learning request to each data party of the set of data parties.

16. The system of claim 12, wherein triggering a round of federated learning comprises:

triggering the plurality of data parties to locally train a plurality of models in parallel by issuing a customized learning request to each data party of the plurality of data parties.

17. The system of claim 12, wherein the operations further comprise:

storing, for each data party of the one or more data parties, using multiple file names that are indicative of multiple rounds of federated learning, multiple versions of a local model uploaded to a corresponding namespace in the object store assigned to the data party during multiple rounds of federated learning.

18. The system of claim 12, wherein the operations further comprise:

storing multiple versions of the shared model uploaded to the shared namespace in the object store during multiple rounds of federated learning.

19. A computer program product for federated learning across a plurality of data parties, the computer program product comprising a computer readable storage medium having program instructions embodied therewith, the program instructions executable by a processor to cause the processor to:

assign each data party of the plurality of data parties with a corresponding namespace in an object store, wherein the corresponding namespace in the object store that the data party is assigned with is unique to the data party;

assign a shared namespace in the object store, wherein the shared namespace is shared by the plurality of data parties;

store one or more model parameters in the shared namespace in the object store;

trigger a round of federated learning by issuing one or more customized learning requests to one or more of the plurality of data parties, wherein each customized learning request issued to each data party of the one or more data parties comprises a link to the object store, a file name to use that is indicative of the round of federated learning, and information identifying both the corresponding namespace in the object store that the data party is assigned with and the shared namespace in the object store, and the customized learning request triggers the data party to fetch the one or more model parameters from the shared namespace in the object store, locally train a model based on training data owned by the data party and the one or more model parameters, and upload using the file name a local model resulting from the local training to the corresponding namespace in the object store that the data party is assigned with;

retrieve, from the object store, at least one local model uploaded to the object store by at least one data party of the plurality of data parties during the round of federated learning; and aggregate the at least one local model retrieved from the object store to obtain a shared model.

20. The computer program product of claim 19, wherein the shared model is uploaded to the shared namespace in the object store.

* * * * *